United States Patent Office 3,178,078
Patented Apr. 13, 1965

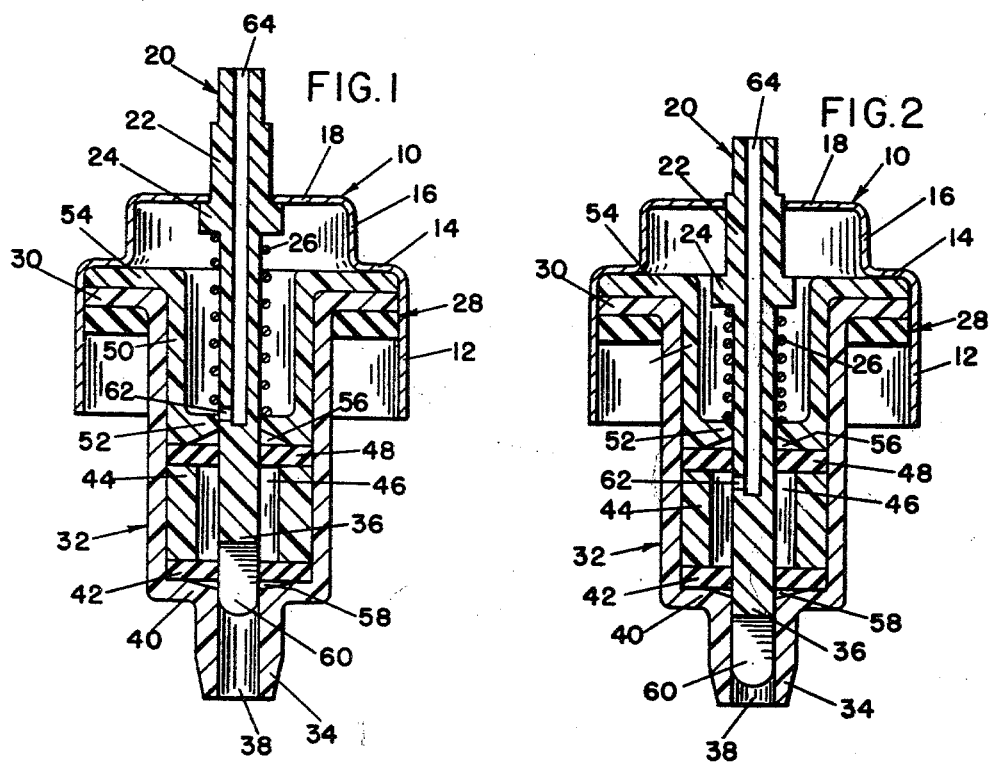

3,178,078
METERED VALVE CONSTRUCTION
John M. Wittke, Westfield, N.J., assignor to Sterling Drug Inc., New York, N.Y., a corporation of Delaware
Filed Dec. 29, 1961, Ser. No. 163,244
2 Claims. (Cl. 222—394)

This invention relates to a new and improved valve construction particularly of the type presenting metered amounts of material to be expressed from pressure containers such as aerosols, and particularly relating but not limited to the pharmaceutical field, the new construction in general obviating problems involved in such devices in the prior art. These problems involve in part frequent non-functioning of the valve due to corrosion, stickiness, etc.; leaking of the contents of the container around the valve stem; failure of the prior art valves to properly operate due to tilting of the valve stems; and general fragility of the parts particularly with respect to thin metal parts in use, etc. Often, a relatively slight change in construction of the parts greatly improves the operation of the valve.

One of the principal objects of the present invention resides in the provision of a new and improved valve for aerosols including a rigid stem, stem spring and special spring follower construction including several stem bearing surfaces at spaced points, eliminating wabble or canting of the valve stem in the operation thereof; and the provision of a new and improved plastic adapter or tank construction which can be easily varied as to capacity by removal and replacement of a plastic sleeve-like part; and having a construction avoiding the usual deformation and leakage of some of the elastic seals currently in use.

Further objects of the invention include the provision of a new and improved rubber, plastic or similar elastomer plug as a metering chamber; a novel combination of such a plug and tank stem gaskets combined with a new spring follower, providing for simpler assembly and control of quality of the device; and the provision of a new and improved stem construction including the follower which obviates bulges or expanded portions thereof which tend in the prior art to deform or press into the gasket components, thus providing a simple and effective metering system with positive "open" and "close" positioning of the stem and valve parts which are constructed to avoid sticking.

Further objects of the invention include a plastic adapter or tank having a plastic sleeve in it to form a metering chamber with rubber gaskets at each end of the sleeve to seal the stem where it enters the chamber, a valve stem spring holding the stem normally in closed condition, and a special new and improved valve stem spring follower of plastic, said follower fitting in the adapter or tank and having an outturned top flange by which it is held crimped to the container and a bottom inturned flange abutting one of the gaskets forming a part of the chamber and holding it in place regardless of the pressure of the spring which abuts the inturned flange.

The invention further relates to arrangements and combinations of parts which will be hereinafter described and more particularly set forth in the claims.

Reference is to be had to the accompanying drawings, in which

FIG. 1 is a central section through a valve construction showing a form of the present invention with the valve closed, and FIG. 2 is a similar view showing the valve open.

The general type of valve which is disclosed in this case is well known and examples of the general construction may be found in United States Patents Nos. 2,721,010; 2,837,249; 2,723,055; 2,788,925 and 2,812,884, as well as others, and copending application Serial No. 851,167 filed November 5, 1959, now Patent No. 3,019,947. While this is a crowded art, it has been found that slight changes are sufficient to impart an improvement of relatively important stature, particularly with respect to sticking of the parts, leaking of the contents, etc.

In the drawings herein, only so much has been shown as to clearly indicate the nature of the present inventive construction. There is in the first place a cap preferably made of some such metal as aluminum. This cap is generally indicated at 10 and it has a skirt 12 which is adapted to be crimped to the under side of the lip of a bottle at the neck thereof. The cap 10 is also directed inwardly as at 14 for a purpose to be described, rising at 16 and then once more being turned inwardly, forming a final top flange 18. This flange is apertured for the sliding reception of the valve stem, preferably made of plastic and generally indicated at 20. This valve stem at all times extends through the cap flange 18 but is movable up and down in order to operate the valve, and is usually provided with some kind of a head by which it is easily operated, this head not being shown.

The valve stem 20 is provided with a slightly enlarged portion 22 which is the part that actually slides in the aperture in cap flange 18. The valve stem is prevented from extending outwardly past a predetermined point by an enlargement as shown at 24 against which a spring 26 finds an abutment at one end. The spring 26 is a compression spring serving to hold the stem in the position shown in FIG. 1 but it yields to allow the valve to open as will be hereinafter explained and as indicated in FIG. 2. One of the inventive concepts in the present invention resides in the abutment at the opposite end of the spring which will be described hereinafter.

There is a rubber washer or diaphragm generally indicated at 28 and this rests against the lip of the container, being crimped thereto by the skirt 12 of the cap 10. This washer forms a seal underlying an outwardly directed flange 30 on an adapter or tank generally indicated at 32. This tank is preferably molded in one piece of plastic and comprises a nozzle portion at 34 which depends downwardly into the container aforesaid, the inner end 36 of the valve stem 20 extending into the passage 38 in this nozzle. The nozzle 34 is relatively small and at its upper end is connected with a main body portion of the adapter or tank 32 by the inwardly directed flange at 40.

Flange 40 forms a base for the deposition thereon of a rubber gasket or seal 42 upon which is mounted a plastic sleeve-like cylindrical member 44, the latter having an internal diameter larger than the diameter of the valve stem as plainly seen in the drawings, so that a chamber is formed within sleeve 44 and above gasket seal 42, the stem of the valve taking up a certain portion of the volume of this chamber. The chamber is indicated at 46 and is closed at its upper end by another gasket seal 48, it being pointed out that the valve stem finds a sealing sliding engagement in central apertures in the gasket seals 42 and 48, thus sealing chamber 46 and providing an accurate metering chamber for the device.

The spring follower is a single integrally molded substantially rigid plastic member which has a main body portion at 50, an inwardly directed flange 52 at the bottom thereof, and an outwardly directed flange at the top thereof as at 54. Flange 52 rests directly upon gasket seal 48 and holds it in position while the flange 54 is held in crimped relation by the inwardly directed portion 14 of the crimped cap 10, and the inner end of the spring 26 finds its other abutment against the upper or inside aspect of the inwardly directed flange 52 of the spring follower. The flange 52 of the spring follower is relieved centrally thereof as at 56 so as to provide for a certain flexure of the gasket seal 48 while the valve stem is moving in its upward direction, but in any event this action provides for close sliding sealing fit at the upper end of the chamber while the flange 40 of the adapter or tank 32 is also correspondingly relieved in the opposite direction at 58 for the same purpose.

The lower end of the valve stem 20 is cut away or slotted at 60 to provide communication between the interior of the container upon which the valve is mounted and the interior of the metering chamber 46. When the valve stem is pressed inwardly as shown in FIG. 2, the slot 60 is completely cut off from the chamber 46 and the interior of the container by means of the gasket seal 42 but then the port at 62 and the passage 64 from port 62 to the outer end of the valve stem comes into communication with the chamber 46, releasing the material therein under pressure to provide a metered dosage of the contents of the container to which the present device is attached.

The construction and operation of the metering aerosol valve above described will be clear to those skilled in the art and particular attention is directed to the fact that the valve spring follower flange 52 holds the outer rim or edge of the gasket seal 48 in position, the valve spring follower in turn being held in position by means of the crimped cap. In prior art constructions, the valve stem spring may impinge upon the gasket seal at the top of the metering chamber, and for this reason often distorts the same, resulting in malfunction, leaking and in some cases variation in the charge of the material in the chamber, but with the present construction, all this is avoided, the spring is positively held in the position at its lower end; the stem is given a still further point of sliding support so that it now will be seen to have five points for such support. One sealing sliding support is in the flange 18 of the cap 10; the second one is in the central aperture in the flange 52 of the spring follower 50; the third one is in the central aperture of the gasket seal 48; there being another such sliding guide occasioned by the central aperture in gasket 42; and the interior of the nozzle 34 forming the walls of passage 38, also may guide the valve stem.

It will therefore be seen that the valve stem of the present case is much more easily actuated and is substantially proof against sticking, leaking, tilting or canting, etc., and therefore the present construction provides a better valve than those of the prior art, and it is believed that the objects of the invention recited above are carried out in an improved manner as the result of the construction of the present case particularly with respect to the construction of the valve spring follower.

Having thus described my invention and the advantages thereof, I do not wish to be limited to the details herein disclosed, otherwise than as set forth in the claims, but what I claim is:

1. A metering valve construction for controlling the discharge of fluid material under pressure from a container, said valve construction comprising
   (a) a one-piece valve tank of generally hollow tubular shape, an external flange on said tank adjacent an end thereof, a cap having a central aperture clamping the flange and the tank to the mouth of the container, a centrally apertured inturned flange at the opposite end of the tank from the external flange,
   (b) a slidable valve stem arranged in the apertures and being guided by the edges thereof, the valve stem having a portion exterior of the cap, a projection on the valve stem located within the cap, a spring bearing against said projection to normally urge the valve stem outwardly relative to the cap,
   (c) means in the tank forming a metering chamber and including a cylindrical member having an internal diameter greater than the diameter of the stem, the stem passing through said cylindrical member,
   (d) and a generally tubular spring follower, said spring follower including an outturned flange at one end thereof and an apertured inturned flange at the opposite end thereof, said valve stem being also slidably received in the aperture in the inturned spring follower flange intermediate the cap and the inturned flange of the tank, said spring finding an abutment formed by said inturned flange on the spring follower, said cap maintaining said outturned flange of the spring follower in fixed relation relative to the tank in the container,
   (e) and a discharge port and a filling port in said stem, said filling port only being in communication with the metering chamber when the valve stem is extended under influence of the spring, and the discharge port being in communication with the metering chamber to the exclusion of the filling port when the stem is pressed relatively inwardly with respect to said tank and said spring follower.

2. The metering valve construction of claim 1 wherein said metering chamber includes rubber gaskets at each end thereof, said gaskets being apertured and slidably and sealingly receiving the valve stem, the inturned flange of the spring follower being located in contacting relation with respect to one of said rubber gaskets.

References Cited by the Examiner

UNITED STATES PATENTS 2,746,796 5/56 St. Germain.
3,003,662 10/61 Meshberg.
3,019,947 2/62 Gorman.

FOREIGN PATENTS 584,233 9/59 Canada.

RAPHAEL M. LUPO, *Primary Examiner.*

LAVERNE D. GEIGER, *Examiner.*